United States Patent [19]

Iwatsuki et al.

[11] Patent Number: 4,967,355
[45] Date of Patent: Oct. 30, 1990

[54] METHOD FOR CONTROLLING SWITCHING OVER OF SPEED STAGES OF TRANSMISSION WITH PRESETTING OF DUE PERIOD

[75] Inventors: Kunihiro Iwatsuki; Hiroji Taniguchi, both of Toyota, Japan

[73] Assignee: Toyota Jidosha Kabushiki Kaisha, Japan

[21] Appl. No.: 215,538

[22] Filed: Jul. 6, 1988

[30] Foreign Application Priority Data

Jul. 9, 1987 [JP] Japan ................ 62-1711842

[51] Int. Cl.$^5$ ............ B60K 41/18; B60K 41/04; F16H 5/28
[52] U.S. Cl. ................ 364/424.1; 74/866; 74/869
[58] Field of Search ........... 364/424.1; 74/866, 867, 74/869

[56] References Cited

U.S. PATENT DOCUMENTS

| | | | |
|---|---|---|---|
| 4,622,866 | 11/1986 | Ito et al. | 74/866 |
| 4,640,393 | 2/1987 | Nishimura et al. | 74/866 X |
| 4,688,449 | 8/1987 | Harada et al. | 74/866 X |
| 4,688,450 | 8/1987 | Hayashi et al. | 74/866 |
| 4,690,017 | 9/1987 | Taniguchi et al. | 74/866 |
| 4,709,596 | 12/1987 | Boda et al. | 74/866 |
| 4,727,772 | 3/1988 | Sumiya et al. | 74/867 |
| 4,730,519 | 3/1988 | Nakamura et al. | 74/866 |

FOREIGN PATENT DOCUMENTS 57-37140  3/1982  Japan .
62-31741  2/1987  Japan .

Primary Examiner—Felix D. Gruber
Attorney, Agent, or Firm—Oliff & Berridge

[57] ABSTRACT

A method for controlling switching over of speed stages of a transmission for a vehicle having two transmission units each independently operable to provide a plurality of gear ratios and connected in series to provide a plurality of overall gear ratios by the addition or balance of the gear of the two transmission units, having sensors for detecting operational conditions of the vehicle such as engine load and vehicle speed, sensors for detecting rotational speed of those intermediate rotational members in the respective transmission units which start to rotate or to stop by switching over of the speed stages, and a computing and controlling means which computes based upon the vehicle operating conditions a due period in which the switching over is to be completed and controls servo actuators for switching over the gear ratios of the transmission units so that the switching over operations for the two transmission units are completed with the end of the computed period.

7 Claims, 5 Drawing Sheets

FIG. 2

|      | C1 | C2 | C0 | B0 | B1  | B2  | B3  | F1 | F2 |
|------|----|----|----|----|-----|-----|-----|----|----|
| Rev. |    | ○  | ○  |    |     |     | ○   |    |    |
| 1st  | ○  |    | ○  |    |     |     | (○) |    | ○  |
| 2nd  | ○  |    |    | ○  |     |     | (○) |    | ○  |
| 3rd  | ○  |    | ○  |    | (○) | ○   |     | ○  |    |
| 4th  | ○  | ○  | ○  |    |     | [○] |     |    |    |
| 5th  | ○  | ○  |    | ○  |     | [○] |     |    |    |

○ ENGAGED

[○] ENGAGED BUT NULLIFIED (○) ENGAGED FOR ENGINE BRAKING

METHOD FOR CONTROLLING SWITCHING OVER OF SPEED STAGES OF TRANSMISSION WITH PRESETTING OF DUE PERIOD

BACKGROUND OF THE INVENTION

1. Field of the Invention

The present invention relates to the art of automatic transmission for a vehicle, and more particularly, to a system for controlling the switching over of speed stages of the automatic transmission.

2. Description of the Prior Art

As an automatic transmission for a vehicle of a relatively high quality type there is known a transmission including two transmission units connected in series, each transmission unit being independently operable to provide a plurality of gear ratios according to switching over of operation of servo actuators incorporated therein, so that a large number of speed stages are available for the total transmission with fine increments of gear ratios. (e.g. Japanese Patent Laying-open Publication No. 57-37140 (1982))

In such a transmission the control of timing is more important in the switching over of operation of the servo actuators for shifting speed stages, because in the upshifting from a certain speed stage to a next higher speed stage a first transmission unit is shifted up while a second transmission unit is shifted down so that the balance of the two changes of gear ratio provides a relatively small increment of the total gear ratio, and therefore, if the shifting down of the second transmission unit precedes the shifting up of the first transmission unit, the transmission is shifted, although temporarily, in the shifting direction opposite to the desired shifting direction.

In view of such requirements it has been proposed in U.S. Pat. No. 4,727,772 corresponding to Japanese Patent Laying-open Publication No. 62-31741 (1987) to control the switching over of operation of the servo actuators in the first and the second transmission unit in coordination with one another. The coordination herein proposed is performed by detecting rotational speed of those rotational members in the first and the second transmission unit which are braked from rotating state toward stoppage or put into rotation from braked state for the switching over of speed stages and by adjusting the operation of the servo actuators in the first and the second transmission unit in accordance with the detected rotational speed of those rotational members so that the respective switching over operations of the first and the second transmission unit are terminated at the same time point.

However, according to the system disclosed in Japanese Patent Publication No. 62-31741 the speed stage shifting performance of the transmission will vary to a large extent, implying that the performance is therefore very unstable, according to small variations of vehicle operating conditions such as engine load and vehicle speed, because the total speed stage shifting performance is influenced by both of the fluctuations in the respective switching over operations of the two transmission units in a manner that a fluctuation in the switching over operation of one transmission unit induces a fluctuation in the switching over operation of the other transmission unit and vice versa so that the instability in the speed shifting of the transmission as a whole is at least doubled by a resonance of instabilities of the two transmission units. Particularly when the two transmission units are switched over in such a manner that one is shifted up thereby to decelerate the engine while the other is shifted down thereby to accelerate the engine, a slight difference in the progressing speed between the two in parallel proceeding switching over operations can cause a great difference in engine load and thereby in engine rotational speed according to which of the switching over of the two transmission units precedes, and therefore the speed change performance of the rotational members upon which the control of operation of the servo actuators is dependent is not constant from one speed change to the next. Therefore, the time required for the same shifting from a certain speed stage to a certain speed stage would vary largely according to slight variations in the vehicle operating conditions. Further, the difference between the time required for upshifting and that for downshifting between certain two speed stages would become too great to allow harmonization of the overall performance of the vehicle.

SUMMARY OF THE INVENTION

The object of the present invention is to provide an improved system for controlling switching over operation of speed stages of the automatic transmission for a vehicle of the type having two transmission units each being independently operable to provide a plurality of gear ratios and connected in series to provide in combination a large number of speed stages, so that a highly stable speed stage switching over operation of the transmission is ensured under various operating conditions of the vehicle.

According to the present invention, the above-mentioned object of the present invention is accomplished by a system for controlling switching over of speed stages of an automatic transmission for a vehicle of the type having a first and a second transmission unit each having an input rotational member, an output rotational member, at least one intermediate rotational member and a servo actuator for selectively braking said intermediate rotational member or rotationally connecting said intermediate rotational member with the other rotational members and independently operable to provide a plurality of gear ratios between said input rotational member and said output rotational member, said first and said second transmission unit being connected in series so as to provide a plurality of speed stages by various combinations of gear ratios of said first and said second transmission unit, comprising:

means for detecting operating conditions of the vehicle including engine load and vehicle speed;

means for detecting rotational speed of said intermediate rotational member in said first transmission unit, the ratio of rotation of which relative to said output rotational member of said first transmission unit is substantially varied according to change of the gear ratio of said first transmission unit;

means for detecting rotational speed of said intermediate rotational member in said second transmission unit, the ratio of rotation of which relative to said output rotational member of said second transmission unit is substantially varied according to change of the gear ratio of said second transmission unit;

means for determining switching over of speed stages of said transmission based upon operating conditions of the vehicle including engine load and vehicle speed detected by said vehicle operating condition detecting means;

means for computing a period during which the switching over of speed stages of said transmission is to be completed based upon operating conditions of the vehicle including engine load and vehicle speed detected by said vehicle operating condition detecting means; and means for controlling operation of said servo actuators in said first and said second transmission unit based upon coordination of rotational speed of said intermediate rotational members in said first and said second transmission unit detected by said intermediate rotational member rotational speed detecting means for said first and said second transmission unit and said computed period so that the switching over of said first and said second transmission unit are respectively completed with the end of said period.

According to a first embodiment of the present invention, said servo actuator control means computes a substantially linear rate of change of rotational speed of said intermediate rotational member at least in one of said first and said second transmission units based upon the amount of change of rotational speed of said intermediate rotational member in said one transmission unit to be accomplished during said period and the time length of said period, computes at successive time intervals target values for rotational speed of said intermediate rotational member in said one transmission unit from said rate of change of rotational speed and the length of time lapsed from the start of change of rotational speed of said intermediate member in said one transmission unit, compares at each said time interval a current rotational speed of said intermediate rotational member in said one transmission unit detected by said intermediate rotational member rotational speed detecting means with each said target rotational speed, and adjusts operational condition of said servo actuator for said intermediate rotational member in said one transmission unit according to the result of the comparison.

According to a second embodiment of the present invention, said servo actuator control means computes at successive time intervals an increment or decrement between a current value and a previous value of rotational speed of said intermediate rotational member at least in one of said first and said second transmission unit detected by said intermediate rotational member rotational speed detecting means, forecasts the length of time further required for said intermediate rotational member in said one transmission unit to complete full change of rotational speed thereof, compares the computed time length with a remaining time restricted by said period, and adjusts operation of said servo actuator in said one transmission unit according to the balance of the comparison.

In the above-mentioned first embodiment, the amount of change of rotational speed of said intermediate rotational member to be accomplished during said period may be computed from the current vehicle speed detected by said vehicle operating condition detecting means and the change of gear ratio of said one transmission unit effected by the switching over of speed stages of said one transmission unit.

In the above-mentioned second embodiment, said servo actuator control means may forecast the length of time further required for said intermediate rotational member in said one transmission unit to complete full change of rotational speed thereof based upon an assumption of a substantially linear subsequent change of the rotational speed of said intermediate rotational member in said one transmission unit at each said time interval.

Alternatively, in the above-mentioned second embodiment, said servo actuator control means may forecast a final rotational speed of said intermediate rotational member in said one transmission unit at the completion of full change of rotational speed thereof based upon an assumption of a substantially linear subsequent change of the rotational speed of said intermediate rotational member in said one transmission unit at each said time interval.

Further, according to a further modification with respect to the above-mentioned embodiments of the present invention, said servo actuator control means controls only one of said servo actuators for one of said first and said second transmission unit until the change of rotational speed of one of said intermediate rotational members controlled by said one servo actuator starts, and thereafter controls said servo actuators for both of said first and said second transmission unit, so that the changes of rotational speed of said intermediate rotational members in said first and said second transmission unit indicative of the progress of engagement or disengagement of the clutches or brakes proceed almost simultaneously in parallel by taking the full time of the above-mentioned due period.

BRIEF DESCRIPTION OF THE DRAWINGS

In the accompanying drawings;

FIG. 2 is a table showing the operating conditions of the clutches and brakes to be effected by the servo actuators and also of the one way clutches incorporated in the transmission for various shift stages of the transmission;

DESCRIPTION OF THE PREFERRED EMBODIMENT

In the following, with reference to the accompanying drawings, the present invention will be described in more detail in terms of the embodiments.

Figure 1:
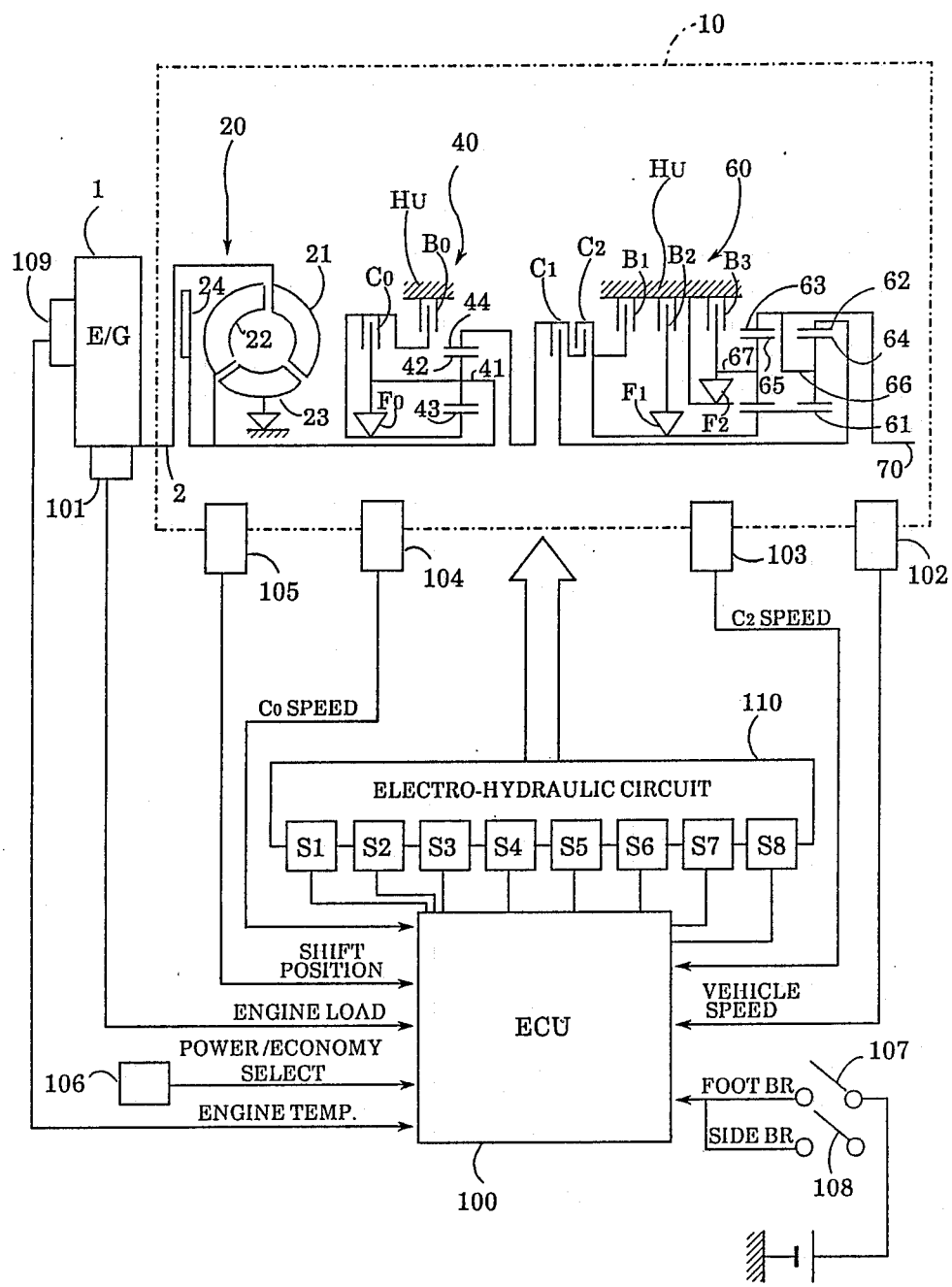
FIG. 1 is a diagrammatical view of an embodiment of the system according to the present invention combined with a transmission having a gear mechanism also schematically shown in the figure.

Referring first to FIG. 1, an engine 1 diagrammatically shown by a block drives a shaft 2 which serves as an input rotational member of the transmission generally designated by reference numeral 10 and including a fluid torque converter 20, an auxiliary transmission unit 40, and a main transmission unit 60.

The fluid torque converter 20 comprises a pump impeller 21 connected with the shaft 2, a turbine runner 22, a stator 23, and a lock up clutch 24.

The auxiliary transmission unit 40 comprises a planetary gear mechanism having a carrier 41 also serving as an input rotational member of the auxiliary transmission unit, planetary pinions 42 (only one is shown), a sun gear 43, and a ring gear 44 also serving as an output rotational member of the auxiliary transmission unit, a clutch C0 for selectively connecting the carrier 41 with the sun gear 43, a brake B0 for selectively braking rotation of the sun gear 43 from the housing Hu of the transmission, and a one way clutch F0 for connecting the sun gear 43 to the carrier 41 only when the carrier 41 would rotate relative to the sun gear 43 in the normal rotational direction.

The main transmission unit 60 comprises a first planetary gear mechanism having a sun gear 61, a ring rear 62, planetary pinions 64 (only one is shown), and a carrier 66, a second planetary gear mechanism having a sun gear common with the sun gear 61, a ring gear 63 connected with the carrier 66 of the first planetary gear mechanism, planetary pinions 65 (only one is shown), and a carrier 67, a clutch C1 having an outside rotational member serving as an input rotational member of the main transmission unit and selectively connecting the ring gear 62 of the first planetary gear mechanism with the ring gear 44 of the auxiliary transmission unit, a clutch C2 for selectively connecting the sun gear 61 to the input rotational member of the main transmission unit, a brake B1 for selectively braking rotation of the sun gear 61 from the transmission housing Hu, a brake B2 for selectively braking rotation of the sun gear 61 from the transmission housing Hu via a one way clutch F1 which is engaged only when the sun gear 61 would rotate in the normal rotational direction when the brake B2 is engaged, a brake B3 for selectively braking rotation of the carrier 67 from the transmission housing Hu, a one way clutch F2 for braking rotation of the carrier 67 only in the normal rotational direction, and an output rotational member 70 connected with the carrier 66 of the first planetary gear mechanism and the ring gear 63 of the second planetary gear mechanism.

The system for controlling switching over of speed stages of the transmission comprises an electronic computing unit 100, means for detecting various operating conditions of the vehicle such as an engine load sensor 101, a vehicle speed sensor 102, a rotational speed sensor 103 for an outside rotational member of the clutch C2 which is connected with the sun gear 61 of the main transmission unit and can indicate by rotational speed thereof the degree of engagement of the brake B2, a rotational speed sensor 104 for an outside rotational member of the clutch C0 which is connected with the sun gear 43 of the auxiliary transmission unit and can indicate by rotational speed thereof the degree of engagement of the brake B0, a shift position sensor 105 for detecting the shift position of the manual shift lever (not shown) for selecting P, R, N, D, 2 and 1 ranges, a pattern select sensor 106 for detecting the shift position of the power pattern select switch (not shown) for selecting a power preference operation or an economy preference operation, a foot brake sensor 107 for detecting the operating condition of the foot brake (not shown), a side brake sensor 108 for detecting the operating condition of the side brake (not shown), an engine temperature sensor 109 for detecting the temperature of the engine 1, and an electro-hydraulic circuit assembly 110 including solenoids S1, S2, S3, S4, S5, S6, S7 and S8 for controlling operation of the lock up clutch 24 and the servo actuators (not shown) for the clutches C0, C1 and C2 and the brakes B0, B1, B2 and B3, respectively.

Figure 3:
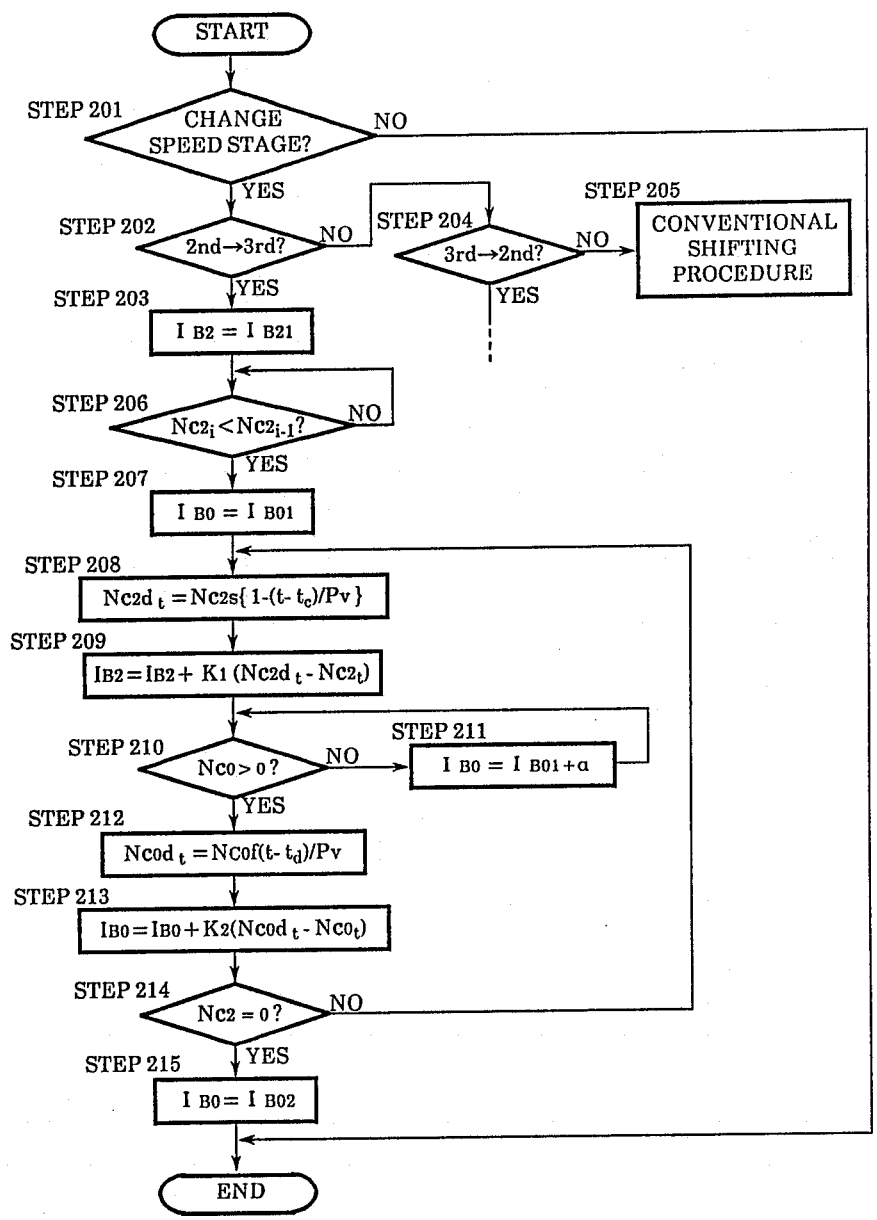
FIG. 3 shows an embodiment of the system according to the present invention in the form of a flow of operations thereof.

The electronic computing unit 100 performs various computing processes based upon the signals received from the above-mentioned various sensors and controls the transmission 10 to set it at one of the 1st through 5th speed stages by operating the clutches and the brakes as shown in FIG. 2 so that the vehicle is operated at an optimum performance available by the equipment fitted in the vehicle under various operating conditions. Some of such computing processes are already well known, some others have just been made publicly known and some others might have been proposed but not yet publicly known. However, since it is the already well known art that fundamentally the switching over of speed stages of the transmission is gradually to engage or disengage at least one of the clutches and the brakes like C0–C2 and B0–B3 in FIG. 1, no detailed descriptions of the fundamental operation of the electronic computing unit will be required, and any such descriptions should be omitted for the purpose of brevity of the specification, except those directly concerned with the present invention which will follow hereinunder:

Referring to FIG. 3, a first embodiment of the system according to the present invention will be described in the form of a flow of operations.

When the system starts its operation, in step 201 the system checks based upon the information received from the above-mentioned various sensors if any switching over of speed stages is required. If the answer is yes, the process proceeds to step 202, while if the answer is no, the process proceeds toward "END".

In step 202 it is checked if the requirement for switching over speed stages is upshift from 2nd to 3rd speed stage. As is noted from the table of FIG. 2, in the upshifting from 2nd to 3rd speed stage the main transmission unit 60 is shifted up by the brake B2 being newly put into engagement so as now to brake the rotation of the sun gear 61, while the auxiliary transmission unit 40 is shifted down by the brake B0 being disengaged while the clutch C0 is put into engagement. Similarly, in downshifting from 3rd to 2nd speed stage the main and the auxiliary transmission unit are also switched over in the different directions opposite to those in the upshifting directions. Therefore, the shifting between 2nd and 3rd speed stages of the transmission herein shown is particularly in need of the system according to the present invention. If the answer is yes, the process proceeds to step 203, while if the answer is no, the process proceeds to step 204. In step 204 it is checked if the requirement for switching over speed stages is 3rd to 2nd downshifting. If the answer is no the process proceeds to step 205. In step 205 an appropriate conventional speed stage switching over operation may be performed, because in the transmission shown in FIG. 1, it is only between the 2nd speed stage and the 3rd speed stage that the main transmission unit and the auxiliary transmission unit are shifted in the relatively reversed directions, and for those other speed stage shiftings the present invention may be omitted. If the answer in step 204 is yes, the system may control the transmission in a manner similar to that described hereinunder with respect to controlling the transmission for 2nd to 3rd upshifting.

Figure 4:
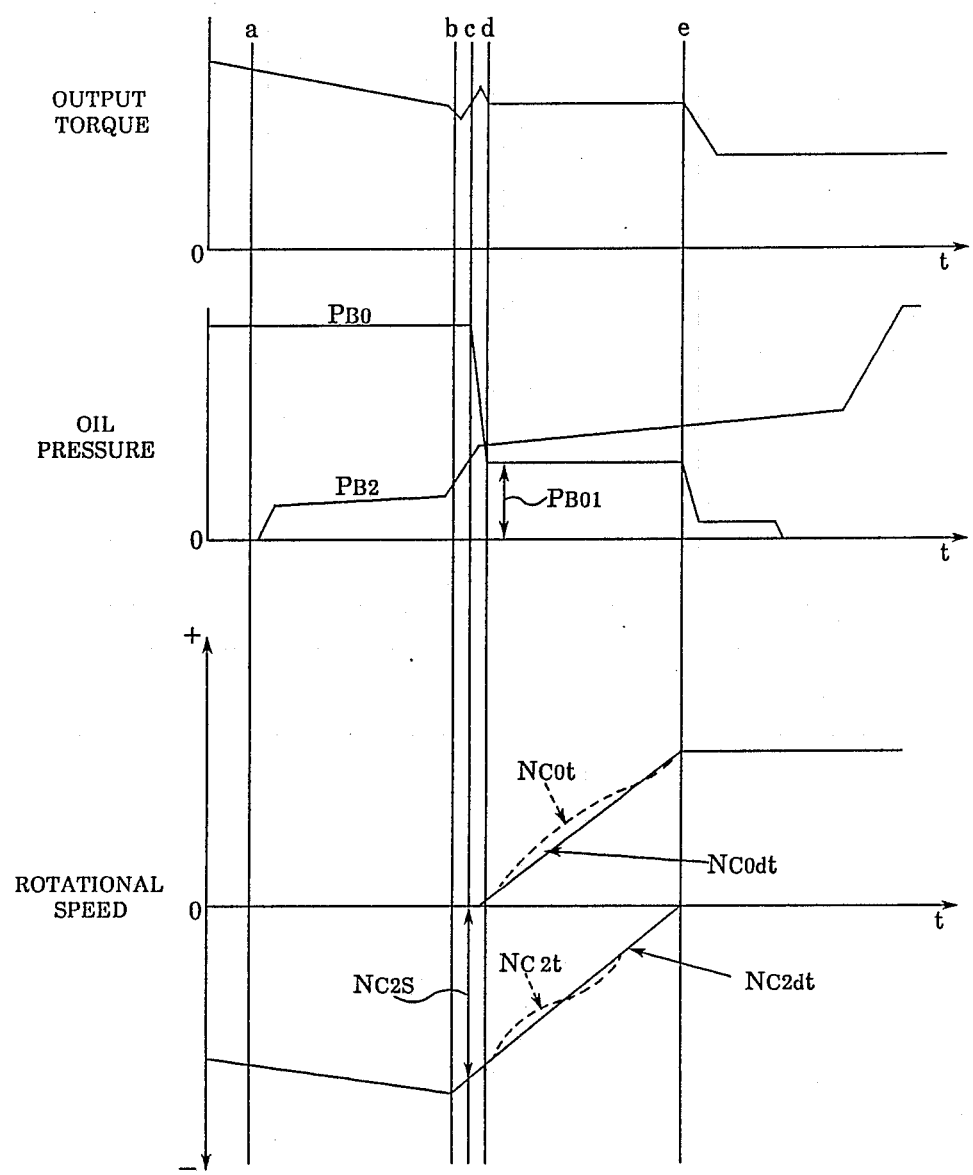
FIG. 4 is a diagram showing variations of the output torque of the transmission, the oil pressures for operating the servo actuators, and the rotational speeds of the rotational members in the transmission during a 2nd to 3rd upshift procedure of the transmission.

In step 203 the engagement of the brake B2 is instructed. According to this instruction the oil pressure $P_{B2}$ starts to increase as shown in FIG. 4. The instruction was given at time point a. In operation, the electric current $I_{B2}$ for operating the servo actuator for the brake B2 is changed to an appropriate value $I_{B21}$. Then the process proceeds to step 206.

In step 206 it is checked if the rotational speed of the outside rotational member of clutch C2 ($N_{C2i}$) is smaller than that at the previous scanning process ($N_{C2i-1}$). If the answer is yes, it means that deceleration of the sun gear 61 has started, that is, the brake B2 has started to be effective, and the process proceeds to step 207. If the answer is no, the process repeats step 206. In the mean time the time proceeds through time points b to c in FIG. 4.

In step 207 the brake B0 is released to a half clutch by the oil pressure $P_{B0}$ therefor being lowered as shown in FIG. 4. In operation, the electric current $I_{B0}$ for the solenoid controlling the servo actuator for the brake B0 is changed from $I_{B0}$ to $I_{B01}$. Then the process proceeds to step 208.

In step 208 a period Pv in which the speed stage switch over operation is to be completed is computed based upon the vehicle operating conditions available from the above-mentioned sensors, particularly engine load and vehicle speed. Then, based upon the Pv and the current value $N_{C2s}$ (at time point c where the time lapsed from the start point a is $t_c$) of the rotational speed $N_{C2t}$ of the outside rotational member of the clutch C2, and by adopting, for the sake of convenience, a linear decrease of $N_{C2t}$ (in fact, the rate of increasing the engagement of the brake B2), the due value $N_{C2dt}$ for the $N_{C2t}$ at each successive scanning process at time t lapsed from the start of speed stage shifting is computed as follows:

$$N_{C2dt} = N_{C2s}\{1-(t-t_c)/Pv\}$$

Here for the purpose of simplicity the values of $N_{C2s}$ $N_{C2t}$ and $N_{C2dt}$ are handled as positive values, although in the diagram of FIG. 4 these values are shown as negative values in view of the rotational direction thereof.

Then the process proceeds to step 209, and the electric current $I_{B2}$ supplied to the solenoid for operating the servo actuator for the brake B2 is changed according to the following formula:

$$I_{B2} = I_{B2} + K_1(N_{C2dt} - N_{C2t})$$

($K_1$ being a constant).

Then the process proceeds to step 210, and it is checked if the outside rotational member of the clutch C0 has started to rotate, i.e. the rotational speed $N_{C0}$ of the outside rotational member of the clutch C0 is larger than zero. If the answer is no, it means that the result of releasing the brake B0 is not effectively manifested, and therefore the process proceeds to step 211, and the electric current $I_{B0}$ for the brake B0 is further modified by alpha.

If the answer in step 210 is yes, the process proceeds to step 212. In this step the expected final rotational speed $N_{C0f}$ of the rotational speed $N_{C0t}$ of the outside rotational member of the clutch C0 is computed by multiplying the current rotational speed of the transmission output member 70 obtained directly or indirectly from the vehicle speed sensor 102 by the gear ratio $r_1$ of the main transmission unit at the 3rd speed stage. Then, based upon the Pv and the $N_{C0f}$ and by adopting, again for the sake of convenience, a linear increase of the rotational speed $N_{C0t}$ a due rotational speed $N_{C0dt}$ for the $N_{C0t}$ at each successive scanning process at time t lapsed from the start of speed stage shifting is computed as follows:

$$N_{C0dt} = N_{C0f}(t-t_d)/Pv$$

Here $t_d$ is the time which generally corresponds to time point d in FIG. 4.

Then the process proceeds to step 213. In this step the electric current $I_{B0}$ supplied to the solenoid for operating the servo actuator for the brake B0 is varied as follows:

$$I_{B0} = I_{B0} + K_2(N_{C0dt} - N_{C0t})$$

($K_2$ being a constant).

Then, the process proceeds to step 214. In this step it is checked if the outside rotational member of the clutch C2 has stopped, i.e. if the rotational speed $N_{C2}$ thereof is zero, and if the answer is yes (time point e in FIG. 4), the process proceeds to step 215, and the electric current $I_{B0}$ for the solenoid for operating the servo actuator for the brake B0 is changed to $I_{B02}$ which allows the brake B0 to be completely disengaged, and then the process proceeds toward "END". If the answer is no, the process returns to step 208.

Figure 5:
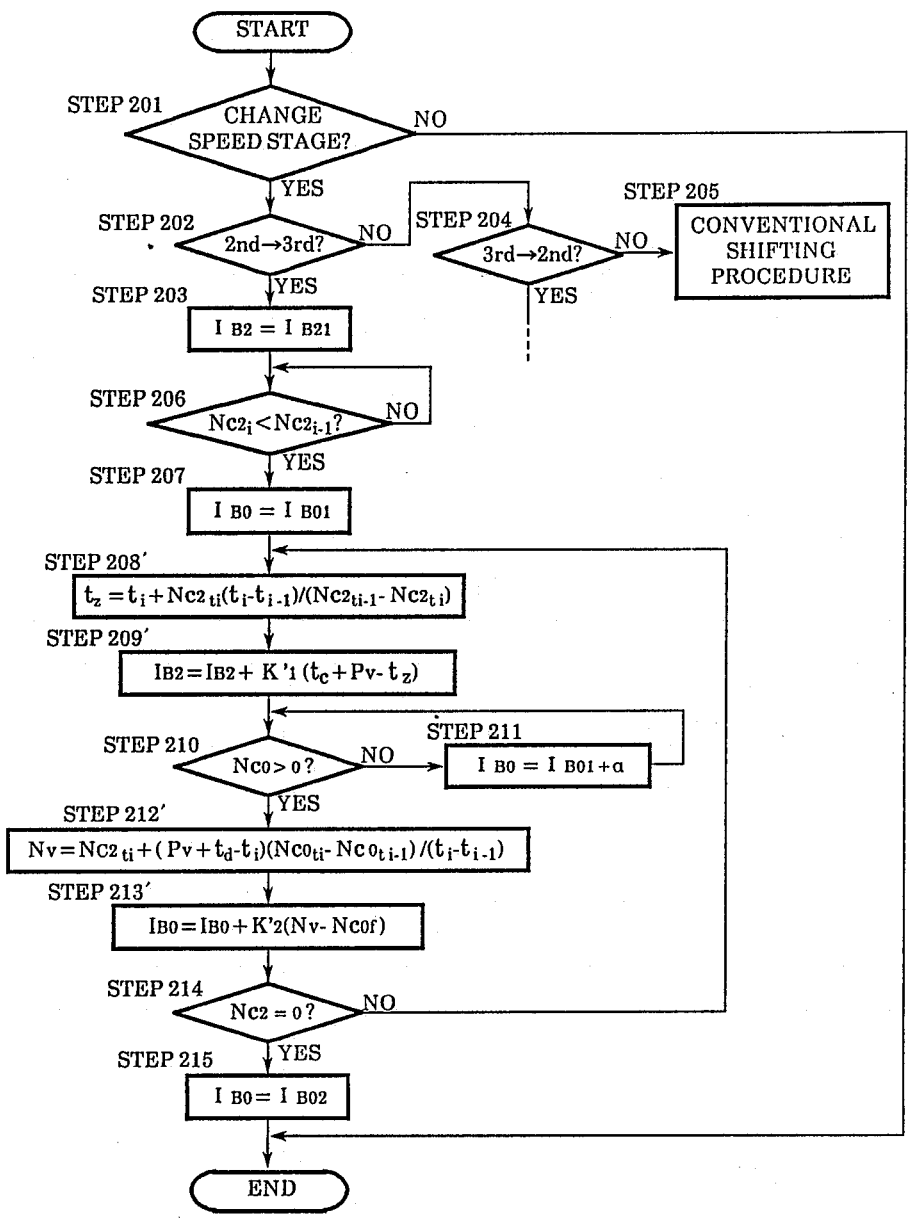
FIG. 5 is a flow chart similar to that shown in FIG. 3, showing the operation of another embodiment of the system according to the present invention.

FIG. 5 is a figure similar to FIG. 3, showing a second embodiment of the system according to the present invention also in the form of a flow of operations. In this embodiment, instead of steps 208 and 209 in the first embodiment, steps 208' and 209' are performed as follows:

It is the same as in step 208 that first the due period Pv is computed based upon the operating conditions of the vehicle, particularly engine load and vehicle speed. Then, the rotational speed $N_{C2t}$ of the outside rotational member of the clutch C2 is sequentially compared with the previous value thereof at each scanning process so as to obtain an increment of change of $N_{C2t}$ as $N_{C2ti-1} - N_{C2ti}$ ($>0$, by taking these variables as positive variables as noted above) and the time $t_z$ at which $N_{C2t}$ becomes zero is forecast according to the following formula:

$$t_z = t_i + N_{C2ti}(t_i - t_{i-1})/(N_{C2ti-1} - N_{C2ti})$$

Then the oil pressure for the servo actuator for the brake B2 is controlled according to the following formula:

$$I_{B2} = I_{B2} + K'_1(t_c + Pv - t_z)$$

Here $t_c$ is the time which generally corresponds to time point c in FIG. 4.

Similarly, in steps 212' and 213' performed instead of steps 212 and 213 in the first embodiment, the rotational speed $N_{C0t}$ of the outside rotational member of the clutch C0 is sequentially compared with the previous value thereof at each scanning process so as to obtain an increment $N_{C0ti} - N_{C0ti-1}$ ($>0$) and the value Nv of $N_{C0t}$ at the end of the period Pv is forecast according to the formula:

$$Nv = N_{C2ti} + (Pv + t_d - t_i)(N_{C0ti} - N_{C0ti-1})/(t_i - t_{i-1})$$

Here $t_d$ is the time which generally corresponds to time point d in FIG. 4.

As in step 212 the final value $N_{C0f}$ of $N_{C0ti}$ is computed based upon the current rotational speed of the transmission output shaft 70 obtained directly or indirectly from the vehicle speed sensor 102 and the gear ratio r₁ of the main transmission unit at the 3rd speed stage. Then the oil pressure for the servo actuator for the brake B0 is adjusted according to the following formula:

$$I_{B0}=I_{B0}+K'_2(Nv-N_{C0f})$$

The second embodiment can control the variation of the rotational speed of the outside rotational members of the clutches C2 and C0 in a non linear manner.

As a third embodiment the steps 208 and 209 in the first embodiment only may be replaced by the steps 208' and 209' in the second embodiment, or as a fourth embodiment the steps 212 and 213 in the first embodiment only may be replaced by the steps 212' and 213' in the second embodiment.

Although the present invention has been described and illustrated with respect of several embodiments thereof, it will be clear to those skilled in the relevant art that various modifications are possible with respect to the shown embodiments within the scope of the present invention.

We claim:

1. A method for controlling switching over of speed stages of an automatic transmission for a vehicle of the type having a first and second transmission for a vehicle of the type having a first and second transmission unit each having an input rotational member, an output rotational member, at least one intermediate rotational member operable to transmit rotational power between said input rotational member and said output rotational member and a servo actuator for selectively braking said intermediate rotational member or rotationally connecting said intermediate rotational member with another one of said rotational members and independently operable to provide a plurality of gear ratios between said input rotational member and said output rotational member, said first and said second transmission unit being connected in series so as to provide a plurality of speed stages by various combinations of gear ratios of said first and said second transmission unit, comprising the steps of:

detecting operating conditions of the vehicle including engine load and vehicle speed by detecting means therefor;

detecting rotational speed of said intermediate rotational member in said first transmission unit by a detecting means therefor;

detecting rotational speed of said intermediate rotational member in said second transmission unit by a detecting means therefor;

determining switching over of speed stages of said transmission based upon the operating conditions of the vehicle including engine load and vehicle speed detected by said vehicle operating condition detecting means;

determining a period during which the switching over of speed stages of said transmission is to be completed based upon the operating conditions of the vehicle including engine load and vehicle speed detected by said vehicle operating condition detecting means; and controlling operating of said servo actuators in said first and said second transmission unit based upon a coordination of respective rotational speeds of said intermediate rotational members in said first and said second transmission unit detected by said intermediate rotational member rotational speed detecting means for said first and said second transmission unit and said computed period so that the switching over of said first and second transmission unit are respectively completed with the end of said period.

2. A method according to claim 1, wherein said control of said servo actuator control means includes computing a substantially linear rate of change of rotational speed of said intermediate rotational member at least in one of said first and said second transmission unit based upon the amount of change of rotational speed of said intermediate rotational member in said one transmission unit to be accomplished during said period and the time length of said period, computing at successive time intervals target values for rotational speed of said intermediate rotational member in said one transmission unit from said rate of change of rotational speed and the length of time lapsed from the start of change of rotational speed of said intermediate member in said one transmission unit, comparing at each said time interval a current rotational speed of said intermediate rotational member in said one transmission unit detected by said intermediate rotational member rotational speed detecting means with each said target rotational speed, and adjusting operational condition of said servo actuator for said intermediate rotational member in said one transmission unit according to the balance of the comparison.

3. A method according to claim 1, wherein said control of said servo actuator control means includes computing at successive time intervals an increment or decrement between a current value and a previous value of rotational speed of said intermediate rotational member at least in one of said first and said second transmission unit detected by said intermediate rotational member rotational speed detecting means, forecasting the length of time further required for said intermediate rotational member in said one transmission unit to complete full change of rotational speed thereof, comparing the computed time length with a remaining time restricted by said period, and adjusting operating of said servo actuator in said one transmission unit according to the balance of the comparison.

4. A method according to claim 2, wherein the amount of change of rotational speed of said intermediate rotational member to be accomplished during said period is computed from the current vehicle speed detected by said vehicle operational condition detecting means and the change of gear ratio of said one transmission unit effected by the switching over of speed stages of said one transmission unit.

5. A method according to claim 3, wherein the length of time further required for said intermediate rotational member in said one transmission unit to complete full change of rotational speed thereof is forecast based upon an assumption of a substantially linear subsequent change of the rotational speed of said intermediate rotational member in said one transmission unit at each said time interval.

6. A method according to claim 3, wherein a final rotational speed of said intermediate rotational member in said one transmission unit at the completion of full change of rotational speed thereof is forecast based upon an assumption of a substantially linear subsequent change of the rotational speed of said intermediate rotational member in said one transmission unit at each said time interval.

7. A method according to claim 1, wherein in said control of said servo actuator control means only one of said servo actuators for one of said first and said second transmission unit is controlled until switching over of the other of said first and said second transmission unit starts, and thereafter both of said first and said second transmission unit are controlled.

* * * * *